May 19, 1970     H. DOMANN ET AL     3,513,324
FREQUENCY CONTROL CIRCUIT FOR AN A-C GENERATOR DRIVEN
BY A PRIME MOVER HAVING ADJUSTABLE FUEL SUPPLY
Filed June 8, 1967     3 Sheets-Sheet 1

INVENTORS:
HELMUT DOMANN &
PETER GUNSSER by Stephen H. Frishauf
Atty

United States Patent Office 3,513,324
Patented May 19, 1970

3,513,324
FREQUENCY CONTROL CIRCUIT FOR AN A-C GENERATOR DRIVEN BY A PRIME MOVER HAVING ADJUSTABLE FUEL SUPPLY
Helmut Domann and Peter Gunsser, Stuttgart, Germany, assignors to Robert Bosch GmbH., Stuttgart, Germany, a limited liability company of Germany
Filed June 8, 1967, Ser. No. 644,580
Claims priority, application Germany, July 20, 1966, B 88,073
Int. Cl. H02p 9/04
U.S. Cl. 290—40                                       15 Claims

ABSTRACT OF THE DISCLOSURE

The output voltage of the generator is applied, phase shifted 90°, to an amplifier which includes a frequency sensitive negative feedback circuit; the output, which will have a phase position with respect to the generator voltage which is strongly dependent on frequency, is taken directly, as well as 180° out of phase and compared in a rectifier circuit with the generator voltage to deliver a control signal for the fuel controller of the generator drive.

---

The present invention relates to a frequency control circuit for an A-C generator driven by a prime mover having an adjustable fuel supply, and more particularly to such an A-C generator driven by an internal combustion engine, such as a diesel engine or a gasoline engine.

For standby and emergency power supplies, for example, as used in hospitals, telephone central stations, radio stations, and other public utilities, it is necessary to provide an auxiliary source of electricity in case the main lines fail. The constancy of frequency, to be obtained from such auxiliary source, must be of the same quality as that supplied by public utilities. This is particularly important in telecommunications equipment which requires a high degree of frequency stability, since such equipment is very sensitive to variations in power supply frequency.

Usually two characteristics of the power supplied are used as control parameters. As illustrated, for example, in FIG. 3 of U.S. Pat. 3,128,750, the power supplied by the A-C generator is measured, and transformed into an electrical value which, upon sudden rise in load, immediately increases the supply of fuel, which thus will vary in accordance with an error signal representative of the power, as measured, supplied to the load. The time lag is very small, since the fuel supply will be increased immediately upon change in load, and frequency variations can be maintained within narrow limits even in the face of sudden load surges.

As a second step in maintaining the frequency of the generator constant, the frequency itself is regulated. In accordance with the above referred to U.S. Pat. 3,128,-750, a desired value of frequency is compared with the actual value and an error signal derived. U.S. Pat. 3,064,-189 illustrates an arrangement including a frequency comparison; in accordance with this disclosure, a stabilized frequency source which is stable over a long time and supplies a signal at power frequency such as, for example, 60 Hz. is required.

The frequency control can be obtained not only from a stable source, but also by means of a resonance circuit, as for example briefly referred to in the aforementioned U.S. Pat. 3,064,189, which resonance circuit is tuned to a desired frequency and which supplies a signal varying in voltage and phase upon deviation of frequency from the desired value. These signals are then utilized for control purposes.

The present invention relates to a control arrangement of the kind in which the stable source of power frequency signals is unnecessary; it is particularly useful for the usual power frequencies of 50 or 60 Hz. and is capable of providing excellent constancy of frequency even over long spans of time.

The use of resonant circuits, particularly at power frequencies, in accordance with the prior art, required inductive and capacitive elements which are large and subject to variation in values, over a period of time, so that upon ageing of the components, constancy of frequency became less than that desired.

It is an object of the present invention to provide a frequency control circuit which is simple to construct, effective in its control and does not require elements which are subject to substantial variation in performance upon ageing.

Subject matter of the invention

Briefly, in accordance with the present invention, a signal is obtained from the output voltage of the generator, which is phase-shifted by about 90°. A multistage A-C amplifier has the phase-shifted output voltage applied thereto. It includes frequency sensitive networks, preferably in a feedback circuit, which provides an output potential the phase position of which relative to the generator output voltage is strongly dependent upon frequency. The same output potential is then inverted by 180° (electrical), likewise strongly dependent on frequency. These signals, strongly dependent on frequency, are then compared with the generator output voltage, and the comparison signal provides an error signal which is indicative of the variation of frequency from the desired value. The two strongly frequency dependent signals are needed in order to provide an error signal varying both in absolute magnitude as well as in sign.

In accordance with the preferred embodiment of the invention, the frequency sensitive feedback circuit is a double T resistance-capacitor network. In accordance with a feature of the invention, the 90° phase-shifted signal can be obtained by means of an R-C network, which may be designed in the form of a low pass filter.

The components of the control circuit can thus be formed of resistances and condensers, each having small temperature coefficients and being substantially independent of ageing, so that a long term frequency stability is obtained with simple and small elements.

The structure, organization and operation of the invention will now be described more specifically with reference to the accompanying drawings, in which.

4 wherein D-C components of the signals have been neglected.

Figure 1:
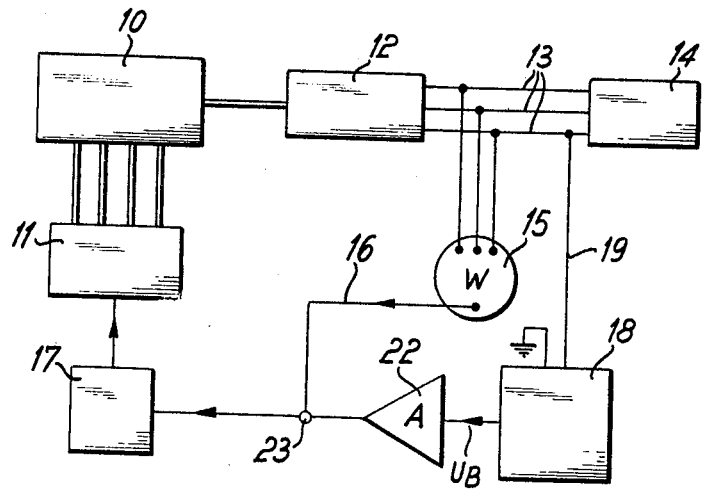
FIG. 1 is a block diagram of a control circuit for an A-C generator, driven by a diesel engine.

Referring now to FIG. 1, which illustrates an entire emergency power supply arrangement: the diesel engine 10, supplied with fuel by an injection pump 11, drives a three-phase generator 12 which supplies a load 14 over lines 13. Instead of a diesel engine, a gasoline engine may be used, in which case the injection pump 11 would be replaced by the control throttle. The three lines 13 are connected to a watt meter 15; voltage or current transformers for the watt-meter-circuit have been omitted for purposes of clarity. The watt meter 15 provides an output signal which is proportional to the power supplied to the load 14, which output signal is supplied over line 16 to a junction 23 and then to a servo motor 17 acting as a controller for the fuel control element such as pump 11; servo motor 17 may be a rotary magnetic system.

The arrangement described so far maintains the speed of the engine 10 approximately constant; if the load on the generator increases, watt meter 15 will measure the increase and control, over line 16, the positioning element 17 by supplying a greater signal thereto, so that positioning element 17 will change the setting of the fuel control element 11 to increase the amount of fuel and thus counteract the slowing in speed of engine 10, which occurred briefly due to the increased loading, thus maintaining the frequency and speed constant. The time lag of reaction can be very short.

The circuit described so far in quick-acting, but does not provide the necessary quality of frequency regulation. To obtain the required constancy of the frequency, a frequency sensing element 18 is connected by means of a line 19 to one of the lines 13, which provides a potential representative of the deviation of the frequency from a desired value. This potential is applied to an integrating amplifier 22 and added at junction 23 to the potential obtained on line 16, thus also to influence the fuel controller 17 to adjust the position of the injection pump 11 (or throttle valve as the case may be). The potential added at junction 23 (which may be an adding network) is superimposed to the output potential of watt meter 15 and thus increases or decreases the signal obtained from watt meter 15 in accordance with the output obtained from amplifier 22.

Figure 2:
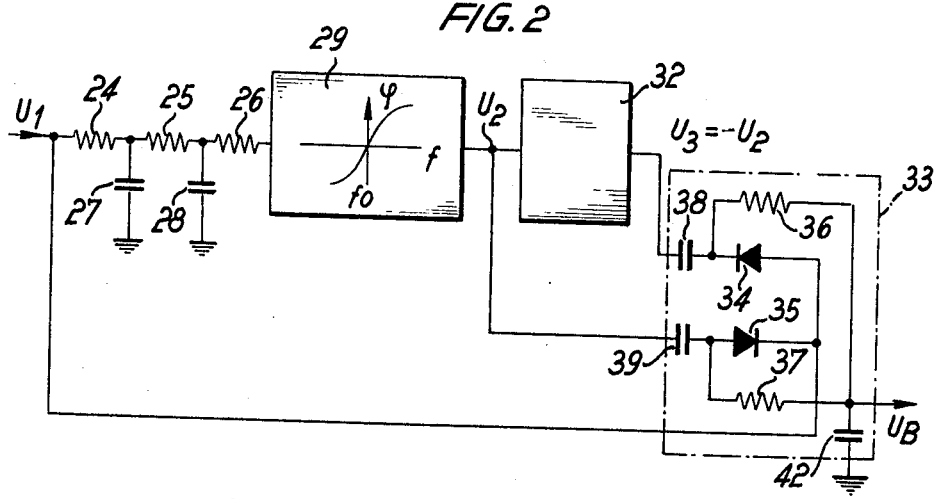
FIG. 2 is a block diagram of the frequency controller for use in FIG. 1.
Figure 3:
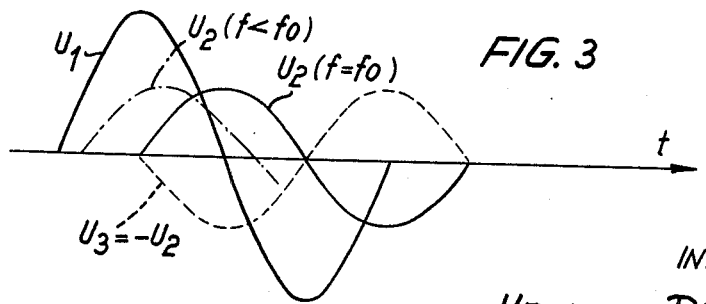
FIG. 3 is a voltage diagram to illustrate the operation of the controller of FIG. 2.

FIG. 2 illustrates a frequency controller 18, in accordance with the present invention, in block diagram form. Three resistances 24, 25, 26, and a pair of condensers 27, 28 together form a low pass filter which simultaneously is a phase shifting network effecting a phase shift of about 90° of a potential U1 obtained from one of the lines 13, and illustrated in FIG. 3. The phase shifted potential is applied to a frequency selective amplifier 29. This amplifier is adjusted to a desired center frequency $f_o$ of the generator 12. If the potential U1 has this frequency, the potentials at the input and the output of the amplifier 29 are in phase, as illustrated in FIG. 3 by potential U2 ($f=f_o$), which is phase shifted with respect to the potential U1 by about 90°. This phase shift, of course, was caused by the action of the low pass filter 24–28.

Figure 7:
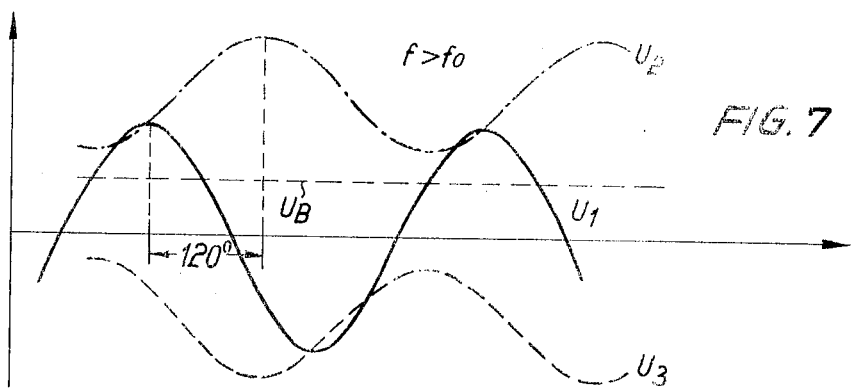

If the actual frequency $f$ is smaller than the desired frequency $f_o$, then the phase shift between the output of amplifier 29 and the input potential will be less than 90° which is illustrated in FIG. 3 by potential U2 ($f<f_o$). If, on the other hand, the actual frequency is too high, then the phase shift will be greater than 90° as seen in FIG. 7 ($f>f_o$).

The potential U2 at the output of amplifier 29 is applied to an inverter 32, which causes a 180° phase shift. For a sine wave, as illustrated in FIG. 2, the relationship $U3=-U2$ will apply. FIG. 3 illustrates potential U3 for the case $f=f_o$.

Potentials U1, U2 and U3 are applied to a phase sensitive rectifier 33. In general, it consists of a pair of series-connected rectifiers 34, 35, of the safe type and similarly poled; with their free terminals connected together by a pair of similar resistances 36, 37; and further over condensers 38, 39 to the output of the inverter stage 32, and the amplifier 29 respectively. The junction point of rectifiers 34, 35 is connected to the generator potential U1. The junction point of resistances 36 and 37 then supplies a control potential $U_B$, smoothed by a condenser 42.

Figure 4:
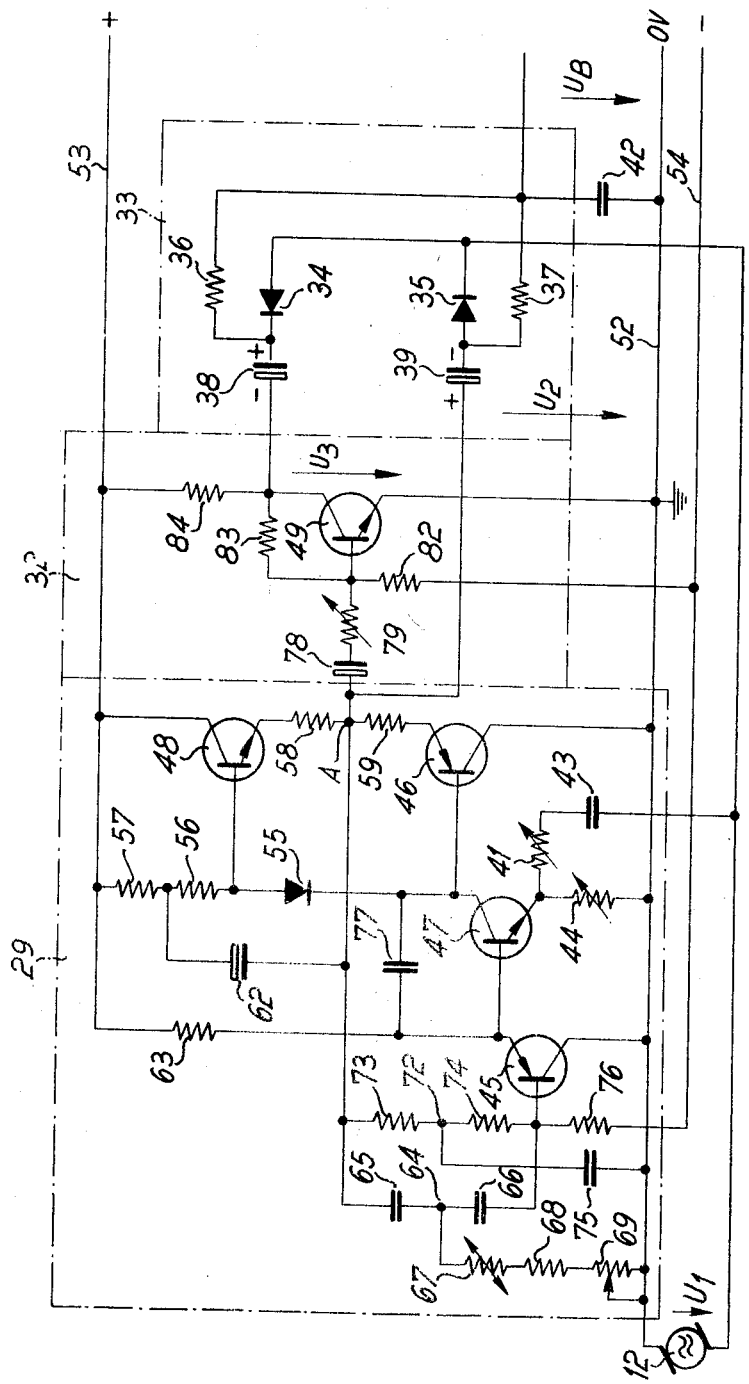
FIG. 4 is a detailed circuit diagram of the control circuit.

FIG. 4 is a detailed circuit diagram of the frequency controller, and more particularly of the frequency sensitive amplifier 29, wherein similar parts have reference numerals as in FIG. 2.

FIG. 2 illustrated a combined low pass filter-phase shift (24–28) input circuit, to effect phase shift of the potential U1 by about 90°. FIG. 4 shows a different embodiment of a phase shift network: adjustable resistance 41, condensor 43, and a series-connected adjustable resistor 44 are adequate if the potential U1 is essentially of sine wave shape. If the voltage has many harmonics, which may occur if small generators are loaded to the limit of their capacity, then the low pass filter as illustrated in FIG. 2 is preferred.

Resistance 44 is connected to the input of the frequency selective amplifier 29, consisting of two p-n-p transistors 45, 46 and two n-p-n transistors 47, 48. The output of amplifier 29 is connected, as before, to the inverter stage 32 which is formed of an n-p-n transistor 49, so that a potential U3, phase shifted by 180° with respect to the potential U2 will obtain at the emitter-collector path.

The phase sensitive rectifier 33, which has potentials U1, U2 and U3 thereto applied is similar to the rectifier described in connection with FIG. 2; its output, as before, has the output voltage $U_B$ representative of deviation from a desired frequency $f_o$.

The frequency selective amplifier 29, the output of which is strongly dependent on frequency, has a transistor 47 which serves as a pre-amplifier for two complementary transistors 46, 48 which together operates as class B push-pull amplifiers. Transistor 47 is connected in emitter circuit, with resistance 44 of the phase shift network 41, 43, 44 being connected between the emitter of transistor 47 and a ground (or chassis) line 52. The emitter of transistor 47 is further connected to phase shift network resistance 41. Chassis line 52 is connected to a source of direct current potential, not shown, which is center tapped and has an output of 2 x 18 v. Plus line 53 will have with respect to the chassis line 52 a potential of +18 v., whereas as the minus line 54 will have a potential with respect to chassis or zero line 52 of −18 v. The zero, or chassis, line serves as a reference potential bus.

The collector of the pre-amplifier stage transistor 47 is connected directly to the base of transistor 46 as well as with the cathode of a diode 55, the anode of which connects to the base of transistor 48. Further, a pair of series-connected resistances 56, 57 connect the anode of diode 55 with the plus line 53. These resistances form together the DC collector resistance of transistor 47. The collector of transistor 46 is connected directly to the chassis bus 52; the collector of transistor 48 is connected directly to the plus line 53. The emitter of transistor 48 is connected over a resistance 58 to a point A; the emitter of transistor 46 is connected by means of a resistance 59 likewise to point A, which serves as an output terminal for amplifier 29. Resistances 58, 59 are of equal low value, for example, about 10 ohms.

A condenser 62 of, for example, 100 μf. is connected between point A and the connection point of resistances 56, 57 to provide for an AC bypass so that the junction between resistances 56, 57 has, for AC, approximately the same value as that of Point A. Since the input resistance to the final stage consisting of transistors 46 and 48 is high, the total AC collector resistance of the transistor 47 becomes very large and a high voltage amplification of this transistor is obtained, which is necessary for complete control of the final stage. Diode 55 provides the necessary bias for the operation of transistors 46, 48 and furthermore stabilizes the temperature because it counteracts changes of the base-emitter potential of transistors 46, 48.

A frequency-dependent feedback circuit is connected from Point A to the base of the transistor 45, operating in a collector configuration. The collector of transistor 45 is connected directly to the zero or chassis bus 52, its emitter directly to the base of the transistor 47, as well as over an emitter resistance 63 to the positive bus 53.

The strongly frequency dependent feedback circuit includes a double-T network. One of the T networks consists of a pair of condensers 65, 66, having a common junction point 64, and interconnecting junction A and the base of transistor 45; further, junction 64 connects over resistances 67, 68 and 69 to the chassis bus 52. Resistance 67 is temperature-dependent, and resistance 69 serves as an adjusting and setting potentiometer.

The other branch of the T network consists of a pair of resistances 73, 74 serially connected and having a junction point 72, and a condenser 75 connected from junction 72 to the chassis bus 52.

Condensers 65 and 66 are of equal value. Condenser 75 has twice the value as that of condensers 65 and 66. Resistances 73 and 74 are of equal value. the resistances 67, 68 and 69, when added, have a resistance value which is half that of resistances 73 or 74. The temperature sensitive resistance 67 (NTC-type) compensates for temperature changes of the double-T network 65–75. The resistances and condensers of the Double-T network are so calculated that, at the desired frequency, a high impedence will obtain, so that there will be very little feedback. For 50 c./s. the following values are representative $$\left(f = \frac{1}{2\pi.R.C}\right)$$

Resistances 73 and 74—each 14.47 KΩ
Resistances 67, 68, 69—together 7.235 KΩ
Condensers 65 and 66—each 0.22 μf.
Condenser 75—0.44 μf.

The two resistances 41, 69 each adjustable, provide for a fine adjustment and together determine the phase position of the output potential U2, which determines the effectiveness of the network. It is a substantial advantage of the arrangement in accordance with the present invention that the constancy of frequency is determined solely by the quality of the elements of the double-T network 65–75 and of the phase shift network 41, 43, 44. The components can be made essentially independent of temperature and age effects but with little difficulty. Thus, in a simple manner, the desired long term frequency stability is obtained without the use of inductive components. Resistance 44 serves at the same time as a feedback element, with which the amplification of the pre-amplifier transistor 47 can be set.

The base of transistor 45 is connected over a resistance 76 (56 KΩ) to the minus bus 54. A condenser 77 of 0.44 nf. is connected between transistors 45 and 47 which serves as an A-C feedback circuit, particularly for elevated frequencies, which are not necessary for the operation of the circuit in accordance with the present invention.

Figure 5:
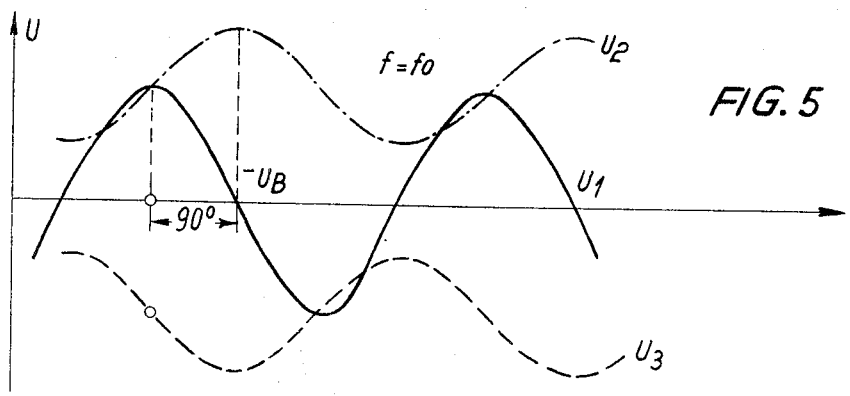
FIGS. 5 to 7 are curves illustrating the operation of the frequency control circuit in accordance with FIG.
Figure 6:
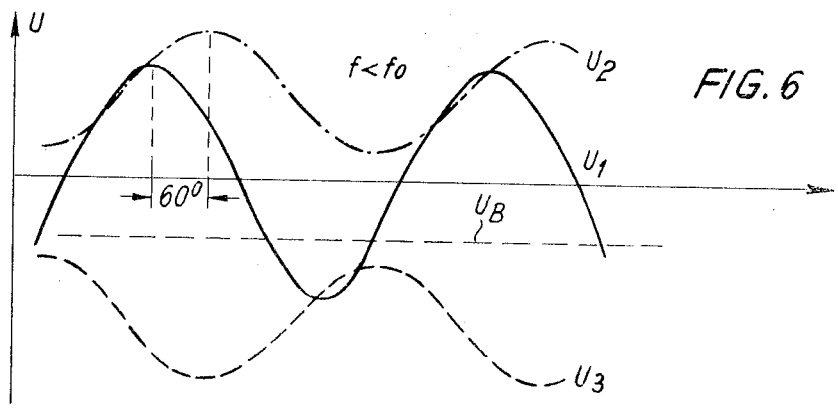

The operation of the amplifier 29 will be described before the entire circuit will be discussed. The emitter of transistor 47 amplifies potential applied thereto, and applies the thus amplified potential to the base of the two complementary transistors 46, 48. npm transistor 48 will amplify only the positive half wave, while pnp transistor 46 will amplify only the negative half wave. When one transistor is conductive, the other one is blocked. The potential of point A thus passes through the complete range of the potential of the plus line 53 (transistor 48 conductive) to the potential of the chassis or reference bus 52 (transistor 46 conductive). If the frequency of the potential U2 at the point A has the desired value $f_o$, to which the double T network 65 to 75 is adjutsed, then the amplifier 29 will not cause a phase shift and the amplification is great. If, however, the frequency departs from the desired value $f_o$, then the feedback circuit will become effective over the double-T network and, besides decreasing the output potential, will cause a phase shift as illustrated in FIGS. 5 to 7. In FIGS. 5 to 7, the horizontal axis is shifted for various curves for purposes of legibility only. FIG. 5 illustrates the condition of $f=f_o$ with a phase difference of 90° between U1 and U2, which is derived essentially only from the phase shift network 43, 44. FIG. 6 illustrates the condition for a phase difference of 60°, that is, $f<f_o$, whereas FIG. 7 illustrates the condition for $f>f_o$, with a phase difference of 120°.

Other frequency sensitive elements than a double T network can be used, although the double T network has the advantage that it makes the amplifier 29 particularly strongly frequency dependent, so that already small deviations of frequency from a desired value result in large phase shifts. A frequency deviation of 1.5 c./s., that is for example, from 50 to 48.5 c./s., causes a phase shift by about 60°, that is, about 20° for each percent of frequency deviation. An ordinary resonance circuit could not approach such values.

Inverter stage 32 is connected to amplifier 29 over a condenser 78 (10 μf.), having an electrode connected to point A and the other to an adjustable resistance 79, which in turn connects to the base of a transistor 49, a resistance 82 connected to the negative line 54, and a resistance 83 which connects to the collector of the transistor 49. The emitter of the transistor 49 connects directly to the chassis bus 52; the collector is connected by means of a collector resistance 84 to the positive line 53.

As seen, transistor 49 is a phase inversion stage; when its base becomes more positive, its collector becomes more negative. The amplification of transistor 49 is adjusted to be unity, that is, potentials, U3 and U2 are identical. The amplification of amplifier 29, however, is arranged so that the potential U1 is approximately twice that of the potential U2 (and thus U3) as also illustrated in FIGS. 5–7.

Condensers 38 and 39 of the phase sensitive rectifier are, due to the low frequency, quite substantial, that is each about 25 μf. Condenser 38 is connected to the collector of transistor 49, condenser 39 to the point A. These two condensers thus have, at any instance of time, a pair of voltages applied thereto which are of inverse polarity, that is 180° phase shifted. The same result would be achieved when a further inversion stage would be connected to stage 32, which once again causes phase shift by 180° and condenser 39 is then connected to such a second inversion stage. The solution here shown is simple and needs less components. Coupling by means of condensers 38, 39 has the additional advantage that the output potential is essentially independent of temperature of the remainder of the network.

Operation of the circuit is as follows: so long as generator 12 is driven by diesel engine 10 at the desired speed, potentials U1, U2 and U3 will have, at the phase sensitive rectifier 33, the relationship indicated in FIG. 5. Condensers 38 and 39 charge to negative and positive potentials, respectively, over rectifiers 34 and 35. Since potentials U2 and U3 pass through null when U1 has its maximum value (they are indicated above each other only for better legibility) the condensers are both charged to the maximum value of U1 as seen in FIG. 4 by the plus and minus signs. The charging potentials on these condensers are superimposed on the potentials U2 and U3. The resistances 36 and 37 (each of about 50 KΩ) thus cause addition of the voltages which, in this case, yield the value of zero; for the relationship $f=f_o$, the potential $U_B$ (FIG. 4) is thus zero.

If the generator 12 is loaded more heavily and the speed of the diesel engine 10 decreases, the frequency $f$ on the lines 13 will likewise decrease. The phase sensitive rectifier 33 then will have the potentials U1, U2 and U3 as seen in FIG. 6. When the potential U1 has its positive maximum value, potential U3 already has a negative value, so that the condenser 38 will be charged to a value which is greater than the peak value of potential U1. Conversely, the potential U2 already has a negative value when the potential U1 reaches its negative maximum and condenser 39 thus cannot be charged to the full peak value of U1. Adding the potentials at the resistances 36, 37 then results in a negative output potential $U_B$ which, amplified by the amplifier 22 and applied to the controller 17 (such as an electro hydraulic servomotor, controlling the control control rod of the injection pump 11) causes setting of the fuel control to a higher fuel amount, so that the speed of diesel engine 10 increases in order to bring the frequency back to its desired value. To prevent hunting, rate damping can be applied between servomotor 17 and the output of amplifier 22, as well known and as not shown for simplicity.

If load 14 is disconnected, the speed of the diesel engine will rise. A portion of this rise is compensated for by the regulation due to the watt meter 15; a residual frequency rise will, however, remain so that the actual frequency $f$ will be greater than the desired frequency $f_o$. The potentials U1, U2 and U3 at the phase sensitive rectifier 33 are illustrated for this condition in FIG. 7. When the potential U1 reaches its positive maximum value, potential U3 still has some positive value so that condenser 38 will not be charged to the full peak value of U1. Conversely, if the potential U2 still has a positive value when the potential U1 reaches its negative maximum, condenser 39 will be charged to a value which is greater than the peak of the potential U1. Upon addition of the potential at the resistance 36, 37, a positive output poenial $U_B$ will be obtained which again is amplified by amplifier 22 and applied to the servomotor 17, which decreases the fuel supplied so that the speed of the diesel engine 10 decreases and the actual frequency $f$ tends to assume the value $f_o$.

The slow discharge of condensers 38, 39 during one cycle causes small harmonics at the output signal $U_B$ which are smoothed by condenser 42.

The phase sensitive rectifier arrangement 32 is essentially insensitive with respect to harmonics and even functions when the wave shape of U1 is a square wave, or a triangular wave. It is thus particularly suitable to control rotational speeds in which the potentials are not sine waves.

Various structural changes and modifications, as determined by the requirements of particular applications or uses may be made without departing from the inventive concept.

What is claimed is:

1. A frequency control circuit for an A-C generator (12) driven by an internal combustion engine (10), to maintain the frequency constant, having means adjusting the amount of fuel being supplied to the internal combustion engine upon deviation of frequency from a desired value, so as to return the frequency to said desired value, comprising
    means providing a first voltage phase-shifted with respect to a second voltage (U1), representative of the output frequency of the generator, by about 90°;
    a frequency sensitive amplifier (29) having said phase shifted first voltage applied thereto and providing an output potential (U2) in which the phase position is strongly dependent on frequency;
    a phase sensitive rectifier (33) having both said frequency dependent output potential (U2) and the second voltage (U1) applied thereto;
    and means deriving a control output signal ($U_B$) from said rectifier (33) and connected to control the fuel supply (11) of said combustion engine (10).

2. Circuit as claimed in claim 1 wherein said phase sensitive rectifier (33) comprises a pair of series connected, serially poled rectifiers (34, 35) having the second voltage (U1) applied to a pair of serially connected common terminals; the free terminal of one rectifier (35) being connected to the output of the frequency sensitive amplifier (29) so that the output potential (U2) of said amplifier is applied thereto; a 180° phase inverter (32) interconnecting the output of said frequency sensitive amplifier (29) and the free terminal of the other rectifier (34) and providing a 180° phase shifted voltage (U3), whereby the generator potential will be compared both in direction and magnitude with the output of said phase sensitive amplifier; and means for producing a control output signal $U_B$ representative of the difference of the voltages on the free terminals of said rectifiers.

3. Circuit as claimed in claim 2 wherein the amplitude of the second voltage (U1) applied to said rectifier pair (34, 35) is about twice the amplitude of said output potential applied in phase (29) and 180° out of phase (32) to said rectifier pair.

4. Circuit as claimed in claim 1, including a phase shifting network (FIG. 2: 24–28; FIG. 4: 41, 43, 44) having its output connected to the input of said phase sensitive amplifier (29) to provide said voltage phase-shifted by about 90°.

5. Circuit as claimed in claim 4 wherein said phase shifting network (FIG. 2: 24–28) has the characteristics of a low pass filter.

6. Circuit as claimed in claim 1 wherein said frequency sensitive amplifier (29) includes a frequency sensitive feedback loop (65–75).

7. Circuit as claimed in claim 6 wherein said frequency sensitive feedback loop is a twin-T network (67, 68, 69, 73, 74, 65, 66, 75).

8. Circuit as claimed in claim 7 wherein said twin-T network includes a temperature-sensitive resistance (67) to provide temperature compensation for said frequency sensitive amplifier (29).

9. Circuit as claimed in claim 1 wherein said frequency sensitive amplifier (29) includes a transistor (44) having an adjustable inverse feedback circuit including an adjustable emitter resistance (44) to adjust the amplification and band width of the amplifier.

10. In a frequency control circuit for an A-C generator driven by an adjustable prime mover, the improvement comprising
    means (FIG. 2: 24–28; FIG. 4: 41, 43, 44) providing a first voltage, phase-shifted with respect to a second voltage (U1) representative of the output frequency of the generator, by about 90°;
    a multi-stage A-C amplifier (29, 32) having said phase shifted first voltage applied thereto and including a frequency sensitive negative feedback circuit (65–75) to provide a first output potential (U2) and a second output potential (U3) 180° out of phase with respect to said first output potential;
    said output potentials (U2 and U3) having phase positions relative to said second voltage (U1) strongly dependent on frequency;
    and a phase comparator circuit (33) having said output potentials (U2 and U3) as well as said second voltage (U1) applied thereto to compare the relative phase positions of said output potentials and said generator output voltage, both in direction and magnitude and providing a control output signal ($U_B$) to control said adjustable prime mover.

11. Frequency control circuit as claimed in claim 10 wherein said frequency sensitive feedback circuit includes a twin-T resistance-capacitance network.

12. Frequency control circuit as claimed in claim 10 wherein said second voltage is the output voltage (U1)

of the generator; and an R-C network having the characteristics of a low pass filter is provided, connected for phase shifting the output voltage (U1) of the generator.

13. Circuit according to claim 2, including a pair of capacitors (38, 39), each interconnecting a respective free terminal of the rectifiers (34, 35) and the frequency sensitive amplifier (29), said control oputput signal ($U_B$) being derived from the difference of the voltages on said capacitors.

14. Circuit according to claim 13, including a pair of substantially similar series connected resistances (36, 37), one each connected at its free terminal to the junction of the free terminal of a rectifier and a condenser, each (34–38; 35–39), said resistances providing at their common junction the control output signal ($U_B$).

15. Circuit according to claim 1, wherein said means providing a first phase shifted voltage, and said phase sensitive rectifier (33) has the output voltage (U1) of the generator applied thereto, whereby said output voltage will itself form said second voltage.

References Cited

UNITED STATES PATENTS

| | | | |
|---|---|---|---|
| 2,558,729 | 7/1951 | Buechler | 290—4( |
| 2,768,331 | 10/1956 | Cetrone | 290—4( |
| 2,775,724 | 12/1956 | Clark | 290—40 XF |
| 2,780,733 | 2/1957 | Chyba | 290—4( |
| 3,128,750 | 4/1964 | Schmidt | 123—14( |
| 3,171,966 | 3/1965 | Bergslien et al. | 290—4( |
| 3,242,346 | 3/1966 | Skoubo | 290—4( |
| 3,342,999 | 9/1967 | Townsend | 290—4( |

GLEN R. SIMMONS, Primary Examiner

U.S. Cl. X.R.

290—51